Feb. 26, 1952 F. R. WERNER 2,587,019
VOUCHER CARD MACHINE RELEASE INTERLOCK
Filed July 1, 1949 4 Sheets-Sheet 1

FIG.1

INVENTOR
FRANK R. WERNER
BY
Carl Bunt
HIS ATTORNEY

Feb. 26, 1952 F. R. WERNER 2,587,019
VOUCHER CARD MACHINE RELEASE INTERLOCK
Filed July 1, 1949 4 Sheets-Sheet 2

INVENTOR
FRANK R. WERNER
BY
HIS ATTORNEY

Feb. 26, 1952 — F. R. WERNER — 2,587,019
VOUCHER CARD MACHINE RELEASE INTERLOCK
Filed July 1, 1949 — 4 Sheets-Sheet 3

INVENTOR
FRANK R. WERNER
BY
Carl Beust
HIS ATTORNEY

FIG. 8

ACCOUNT NO. 275

| | | | |
|---|---|---|---|
| 1 | MARCH | 50 | 00 |
| 2 | MAY | 50 | 00 |
| 3 | JULY | 50 | 00 |
| 4 | SEPTEMBER | 50 | 00 |
| 5 | NOVEMBER | 50 | 00 |
| 6 | JANUARY | 50 | 00 |
| | | 300 | 00 |

RECEIPT NO. 6

RECEIPT NO. 5

RECEIPT NO. 4

RECEIPT NO. 3

RECEIPT NO. 2

RECEIPT NO. 1

-6 III 47    0025 ∽ 50.00
JOHN DOE    COLLECTOR

| VOUCHER FOR PAY PERIOD JANUARY | ACCOUNT NO. 275 | VOUCHER FOR PAY PERIOD NOVEMBER | ACCOUNT NO. 275 |
|---|---|---|---|
| 6 | | 5 | |
| CERTIFICATION | | CERTIFICATION | |
| VOUCHER FOR PAY PERIOD SEPTEMBER | ACCOUNT NO. 275 | VOUCHER FOR PAY PERIOD JULY | ACCOUNT NO. 275 |
| 4 | | 3 | |
| CERTIFICATION | | CERTIFICATION | |
| VOUCHER FOR PAY PERIOD MAY | ACCOUNT NO. 275 | | |
| 2 | | | |
| CERTIFICATION | | | |

FIG. 9

| VOUCHER FOR PAY PERIOD MARCH | ACCOUNT NO. 275 |
|---|---|
| 1 | |
| CERTIFICATION | |
| -6 III 47    0025 ∽ 50.00 | |

INVENTOR
FRANK R. WERNER
BY
*Karl Beust*
HIS ATTORNEY

Patented Feb. 26, 1952

2,587,019

UNITED STATES PATENT OFFICE 2,587,019

VOUCHER CARD MACHINE RELEASE INTERLOCK

Frank R. Werner, Dayton, Ohio, assignor to The National Cash Register Company, Dayton, Ohio, a corporation of Maryland Application July 1, 1949, Serial No. 102,658

10 Claims. (Cl. 235—130)

This invention relates to improvements in machine release control mechanisms for cash registers, accounting machines, and like machines.

The invention is illustrated herein as applied to a machine of the type illustrated in United States Patent No. 2,209,763, issued to Ernst Breitling on July 30, 1940, and as illustrated in co-pending application Serial No. 58,114, filed November 3, 1948.

The principal object of the invention is to provide machine releasing control mechanism for a printing mechanism for recording on a main portion of a printed form, on vouchers detachable therefrom, and on a detail strip.

An object of the invention is to provide a mechanism to warn an operator that a voucher has not been removed from the machine upon completion of an operation of the machine.

Another object of the invention is to provide novel feeler mechanism to prevent release of the machine when no printed form is in the machine.

A specific object of the invention is to provide means to lock the machine against a second operation when a voucher is not removed from the machine after the previous operation.

Another specific object of the invention is to provide a means to prevent operation of the machine when no voucher is present in the voucher receptacle prior to an operation thereof, and to prevent a succeeding operation until the voucher has been removed and another voucher has been inserted into the voucher receptacle.

Another object of the invention is to provide a normally locked machine with means, actuated by the insertion of record material, to unlock the machine for releasing movement.

A specific object of the invention is to provide a normally locked machine releasing means with a locking device which is normally in position to prevent operation of the machine releasing means, and which locking device is moved out of normal position by the record material when the latter is positioned into the machine.

Another object of the invention is to provide a means to maintain the record material against shifting movement during printing operations, said means being released to move into effective position upon release of the machine for operation.

With these and incidental objects in view, the invention includes certain novel features of construction and combinations of parts, a preferred form or embodiment of which is hereinafter described with reference to the drawings which accompany and form a part of this specification.

General description

Figures 8, 9:
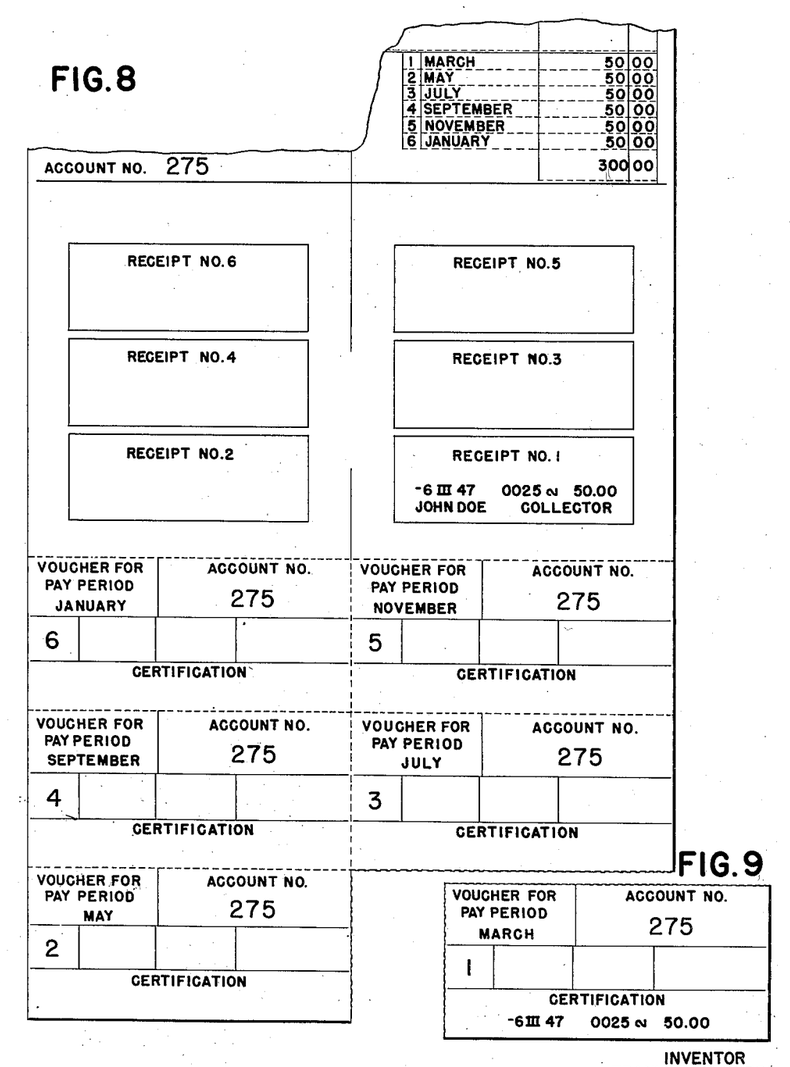
Fig. 8 is a facsimile of a form on which printed records are made by the machine.
Fig. 9 is a detail view of a detached voucher, shown removed from the form illustrated in Fig. 8.

The invention is illustrated herein as being adapted to record items in connection with income tax collections and is particularly adapted to a system used in Sweden. The tax form illustrated in Fig. 8 shows only a fragmentary portion of the entire form, a part in which the data relating to a taxpayer and the method of calculating tax have been omitted, and only those parts of the forms adapted to receive records in the machine are illustrated herein. In the collection of income taxes, the amount of tax is calculated and entered near the upper right-hand corner (Fig. 8) according to the months in which the installments of the tax are to be paid, together with the total amount of the tax. The form is provided with six detachable vouchers, which are consecutively numbered in the order in which the installments are to be paid. The tax collector files the return in his office, and, when an installment is due, a voucher is detached therefrom and sent to the taxpayer. In making installment payments, the taxpayer brings the voucher (Fig. 9) to the tax collector's office and tenders the amount of the tax. The tax collector removes the form (Fig. 8) from his files and inserts the form in the proper position on the slip table provided therefor in the machine. The voucher is inserted in a voucher receptacle, where the amount of tax paid is entered during the machine operation, and the voucher is automatically certified in the machine.

In order that the records are complete, both on the form (Fig. 8) and on the voucher (Fig. 9), the machine is provided with certain safeguards so that the machine cannot be operated until the form and the voucher are in the machine. When the form is inserted in the machine (Fig. 8), a lock for the machine release mechanism is unlocked by the form itself; that is to say, when the form is inserted in the machine, the machine release shaft lock is actuated. When the voucher is dropped into its receptacle, a second lock for the machine release shaft is also actuated. Thus two locks are provided for the release shaft, one operated by a form 181 (Fig. 8) and the other operated by a voucher 210 (Fig. 9). The voucher may be overlooked by the operator and left in the machine, which would result in the taxpayer's not getting a proper receipt. In order to warn the operator that the voucher was not removed from the machine, a third lock is provided, which lock becomes effective at the end of the machine operation and which remains effective until the voucher is removed from the voucher receptacle. Removal of the voucher from the receptacle renders said second lock effective, and, before the machine can be released for a subsequent operation, another voucher must be placed in the voucher receptacle.

The data set up in the machine which is to be printed on the form (Fig. 8) and on the voucher (Fig. 9) is set up by the usual lever, shown in the above-mentioned Breitling patent. In addition to the entries made on the insertable forms, an entry is also made on an audit tape. Therefore the machine is provided with three lines of type wheels which are adjusted by the amount levers of said machine.

Detailed description

The machine to which the present invention is shown applied is provided with a series of setting levers 30 (Fig. 7) pivotally mounted on a cam shaft 31. Each lever 30 is provided with a series of teeth 32, meshing with a pinion 33, secured to a shaft 34, which shaft extends into the printer section of the machine and by means of which type carriers are positioned commensurate with the setting of the levers 30.

Figures 5, 6, 7:
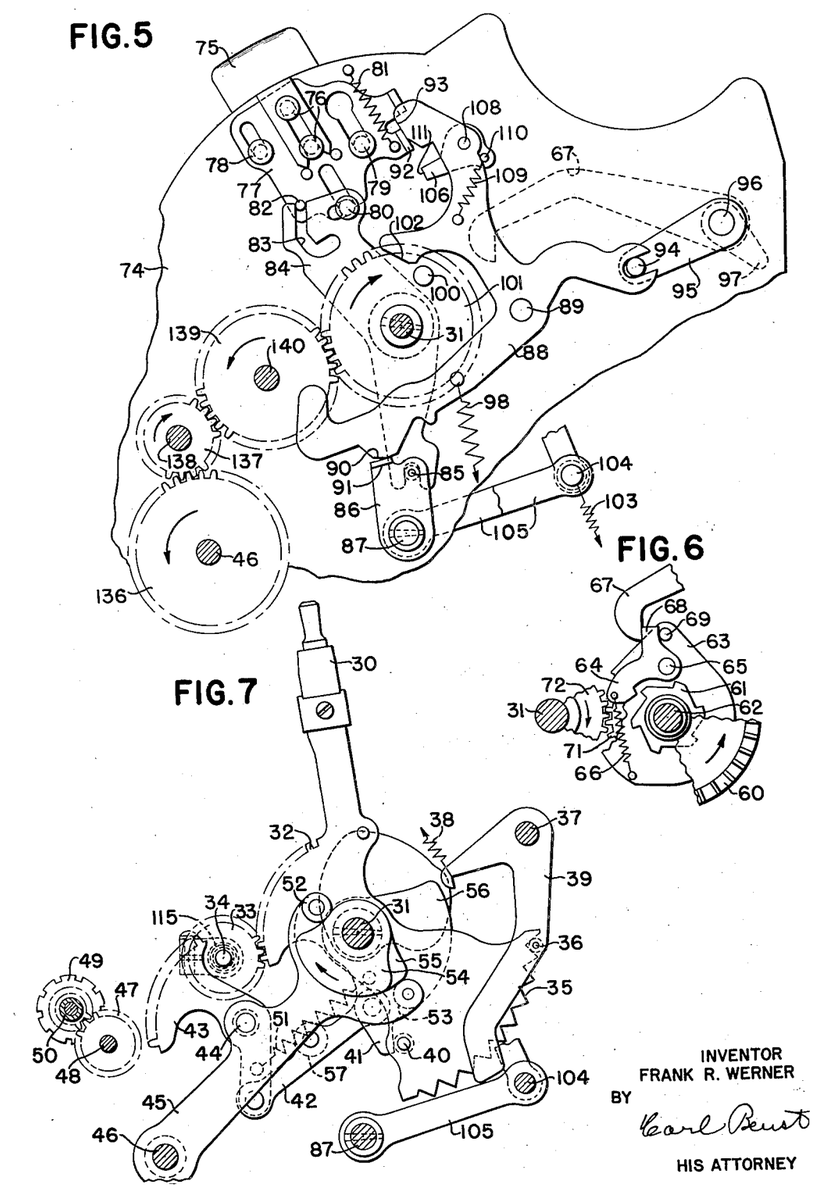
Fig. 5 is a detail side elevation of a part of the mechanism for releasing the machine for operation.
Fig. 6 is a detail view of a part of the mechanism for operating the machine by an electric motor.
Fig. 7 is a detail side elevation view of the amount differential mechanism and shows one totalizer element.

The lever 30, shown in Fig. 7, is shown for adjusting the type carriers through the shaft 34. Other levers, similar to the lever 30, are provided, each of which is provided with teeth 32, meshing with pinions 33, which pinions are connected to nested sleeves for setting up type carriers in the printer.

The lever 30 is provided with alining notches 35, engageable by a stud 36 on the lever 39, pivoted on a shaft 37, and held in the position shown by a spring 38. As the lever 30 is adjusted for setting up an amount, the stud 36 ratchets in and out of the notches 35. As fully described in the above-mentioned Breitling patent, means is also provided for locking the stud in a notch 35 during the machine operation to prevent manipulation of the lever 30 during a machine operation.

The upper end of the lever 30 projects through a slot in the cabinet of the machine, where the lever can be manipulated.

Each of the amount levers 30 carries a stud 40, which cooperates with a corresponding arm 41, loose on the shaft 31, which arm 41 is connected by a link 42 to an arm of a segmental gear, or totalizer driving member, 43, loose on a rod 44, supported by similar plates 45, and the arms 41 are pivotally supported on a shaft 46, journaled in the framework of the machine. The plates 45 are held in rigid relation to each other by the rod 44, the entire assembly forming a rockable frame adapted to rock the teeth of the segments 43 into engagement with similar teeth of the corresponding totalizer gear 47, rotatably mounted on a shaft 48 supported by the framework of the machine. The gear 47 meshes with a pinion integral with a corresponding totalizer wheel 49, free on a shaft 50, supported by the framework of the machine.

A spring 51, tensioned between each of the segments 43 and the arms 41, urges said segments and arms counter-clockwise, as viewed in Fig. 7, to maintain the arms 41 in contact with the studs 40. It is therefore evident from the foregoing description that positioning of the lever 30 also positions the corresponding segments 43 to similar positions.

Each of the plates 45 carries rollers 52 and 53 adapted to cooperate with their respective companion plate cams 54 and 55 fast on the main shaft 31. As described hereinafter, rotation of the main shaft 31 one clockwise revolution completes operation of the machine. Initial movement of the shaft 31 causes the cams 54 and 55, in cooperation with the rollers 52 and 53, to rock the framework, composed of the plates 45, counter-clockwise to engage the teeth of the segments 43 with their corresponding totalizer gears 47. After the segments 43 have been engaged with the gears 47, continued movement of the main shaft 31 causes a cam 56 for each denominational order, secured on the main shaft 31, to engage corresponding rollers 57, mounted on the links 42, and return the segments 43 from set position clockwise to normal position. This rotates the totalizer wheels 49 proportionately to the amount set up on the amount levers 30 to enter said amount in said totalizer wheels.

A dwelling portion in the peripheries of the cams 56 causes the segments 43 to remain in zero position until further rotation of the shaft 31 causes the cams 54 and 55 to rock the segment frame clockwise to disengage the segments 43 from the totalizer gears 47, whereupon declining surfaces on the cams 56 permit the springs 51 to return the segments 43 and their associated links 42 and arms 41 counter-clockwise to their set positions, which positions are determined by the arms 41 contacting the studs 40.

A tens transfer mechanism, as shown and described in the above-mentioned Breitling patent, is provided for transferring from the lower orders to the higher orders, when the lower orders pass through zero.

Operating mechanism

The machine may be operated by means of a manually-operable hand crank (not shown, but well known in the art) or by an electric motor. When an electric motor is provided, a gear (not shown) is driven by the armature thereof, which gear meshes with a crown gear 60 (Fig. 6) to rotate it in a counter-clockwise direction, as viewed in Fig. 6. The gear 60 is secured to a ratchet wheel 61, and the assembly, including the gear 60 and the ratchet wheel 61, is rotatably mounted on a stud 62, carried in the left side frame of the machine. Also mounted on the stud 62 is a disk 63, carrying a clutch pawl 64 pivotally mounted on a stud 65 thereon. A spring 66, connected to one end of the clutch pawl 64 and to a stud carried by the disk 63, normally tends to move the clutch pawl 64 into engagement with the ratchet wheel 61. When the machine is at rest, a stop arm 67, described later, lies in the path of an upstanding arm 68 of the clutch pawl 64, and the arm 68 is engaged by a stud 69 on the disk 63 to thereby provide a positive stop for the disk 63.

When the machine is released for operation in a manner described hereinafter, the stop arm 67 is raised out of engagement with the arm 68, thus permitting the spring 66 to move the clutch pawl 64 into engagement with the ratchet wheel 61, which at this time is being rotated by the motor. When the clutch pawl 64 drops behind a tooth of the ratchet wheel 61, the ratchet wheel carries the pawl, together with the disk 63, counter-clockwise. As the upstanding arm 68 again approaches home position, the arm 67 is again lowered, in the manner described hereinafter, into the path of the upstanding arm 68, thus forcing the upstanding arm 68 against the stud 69 and thereby arresting the disk 63 after the main shaft 31 has completed one complete rotation. Also secured to the disk 63 is a gear 71 meshing with a gear 72 secured to the main shaft 31. Therefore, when the disk 63 is arrested, the gears 71 and 72, and the main shaft 31, are arrested, after the main shaft makes one complete rotation. The ratio between the gears 71 and 72 is 1 to 1. In other words, one complete rotation of the gear 71 causes one complete rotation of the gear 72 and of the main shaft 31.

*Machine release mechanism*

After the levers 30 have been properly positioned, the machine may be released for operation by the depression of a motor bar 75 (Fig. 5), depression of which releases mechanism to withdraw the arm 67 from engagement with the upstanding arm 68 of the clutch pawl 64, and also operates mechanism to close a switch through the motor to start the motor in operation.

The motor bar 75 (Fig. 5) is removably mounted on two studs 76 carried by a slide 77. The slide 77 is slotted to slide on three studs 78, 79, and 80, carried by the right side frame 74 of the machine. A spring 81, having one end connected to a stud on the slide 77 and the other end to a stud in the side frame 74, normally maintains the slide 77 in its upward position, where its movement is limited by studs 78 and 79. The slide 77 is provided with a stud 82, projecting into a cam slot 83 of a lever 84, pivotally mounted on the main shaft 31. The lower end of the lever 84 is bifurcated to engage over a stud 85 mounted in an arm 86 secured to a machine release shaft 87. A multi-armed lever 88 is pivotally mounted on a stud 89, carried by the side frame 74, and one arm thereof is provided with an enlarged head 90 normally held against a flange 91, on the arm 86, by a spring 98.

Depression of the motor bar 75 moves the slide 77 downwardly, thus moving the stud 82 in the cam slot 83 to cam the lever 84 clockwise. A clearance slot is provided in the lever 84, engaging the stud 80 to permit such a movement.

Clockwise movement of the lever 84, through the stud 85, rocks the arm 86 counter-clockwise, thus removing the flange 91 from beneath the surface 90, to free the multi-armed lever 88 to release the machine in a manner to be described presently.

Simultaneously with the lowering of the slide 77, a flange 92 on the slide 77 is moved out of the path of an enlarged head 93 on an upwardly-extending arm of the multi-armed lever 88. Thus, when the flanges 91 and 92 are withdrawn from the respective enlarged portions 90 and 93, the spring 98 can rock the multi-armed lever 88 counter-clockwise (Fig. 5).

A rearwardly-extending arm of the multi-armed lever 88 is bifurcated to engage a stud 94 on an arm 95, secured to a shaft 96, carried by the framework of the machine. Also secured to the shaft 96 is the beforementioned arm 67. Therefore, when the multi-armed lever 88 is rocked counter-clockwise by the spring 98, the arms 95 and 67 are rocked clockwise to withdraw the end of the arm 67 from engagement with the upstanding arm 68 of the clutch pawl 64, thus releasing the clutch pawl 64 to the action of its spring 66, to cause the main shaft of the machine to start its operation.

Also secured to the shaft 96 is a switch operating arm 97, which is adapted to close a switch through the electric motor, in the manner well known in the art and not shown herein.

The multi-armed lever 88 and the arm 67 are restored to their normal positions near the end of machine operation by a stud 100 (Fig. 5) mounted on the side of a gear 101, secured to the main shaft 31. When the multi-lever 88 is released to the action of the spring 98, upon depression of the motor bar 75, and the multi-armed lever 88 is rocked counter-clockwise, a cam surface 102 is moved into the path of the stud 100. Then, near the end of the operation of the main shaft 31, when the stud 100 approaches the terminus of its movement, the stud 100 engages the cam surface 102 on the multi-armed lever 88 and rocks the arm clockwise back to its normal position. At this time, the arm 86 is moved to position its flange 91 under the enlarged surface 90 by a spring 103, secured to a rod 104, to which is also secured a plurality of arms 105 secured to the shaft 87. Restoration of the arm 86 also restores the lever 84 to its normal position, thus permitting the stud 82 to rise in the cam slot 83 and permit the slide 77 to be restored to its home position by the spring 81. Simultaneously with the restoration of the slide 77 to its normal position, it positions the flange 92 into the path of the enlarged end 93 of the multi-armed lever 88.

A non-repeat pawl 106 is pivotally mounted on a stud 107, carried by the multi-armed lever 88, to which is also attached a spring 109. The spring 109 normally maintains a stud 110 against one side of an arm of the multi-armed lever 88. When the slide 77 is lowered by depression of the motor bar 75, the flange 92 engages the upper side of the pawl 106 and rocks it counter-clockwise. Upon release of the motor bar 75 before the end of the machine operation, the flange 92 is again raised, thus freeing the pawl 106 to the action of the spring 109, whereupon the parts assume the position shown in Fig. 5. If, however, the operation should hold the motor bar depressed until the end of machine operation, then, when the multi-armed lever 88 is restored to its home position by the stud 100, the pawl 106 is rocked from beneath the flange 92, whereupon the spring 109 snaps the pawl 106 into position to engage the right side of the flange 92. The flange 92 therefore prevents the multi-armed lever 88 from being restored to its home position, and therefore the machine cannot be released for another operation until the operator removes his finger from the motor bar 75. When he releases his finger from the motor bar 75 to permit the spring 81 to restore the motor bar 75 to its home position, the flange 92 passes beyond the end 111 of the pawl 106, thus permitting the spring 109 to restore the multi-armed lever 88 to its home position, ready for the next operation of the machine.

Type-setting mechanism

Figure 1:
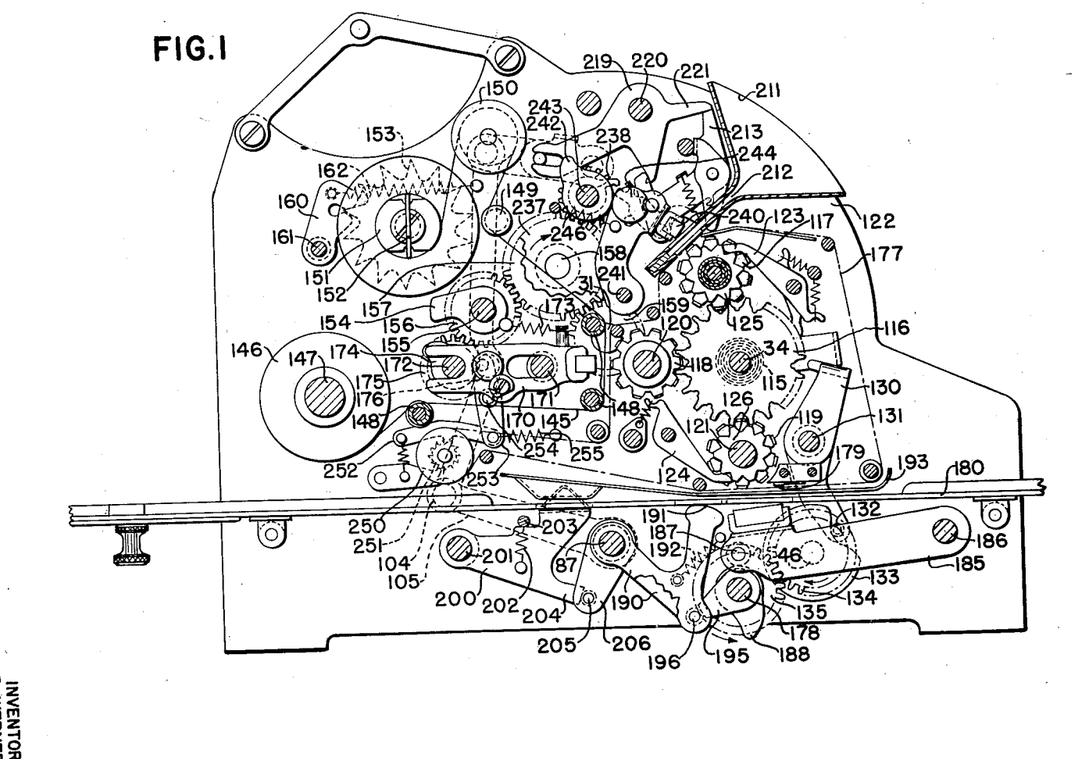
Fig. 1 is a side elevation showing the printing mechanism of the machine.

The shaft 34 (Fig. 1), together with the nest of sleeves 115, surrounding the shaft 34, is adjusted in accordance with the position of the levers 30 (Fig. 7), as hereinbefore mentioned. The shaft 34 and the sleeves 115 project into the printer section of the machine (Fig. 1). Secured to the shaft and to each sleeve 115 in the printer section of the machine is a gear 116, each meshing with three type wheels 117, 118, and 119. The type wheels 117 are provided to set up data to be printed on the insertable vouchers shown in Fig. 9. The type wheels 118 are provided to set up data to be printed on the audit tape hereinafter described, and the type wheels 119 are provided to set up data to be printed on the printed form shown in Fig. 8. The type wheels 118 and 119 are rotatably mounted on shafts 120 and 121, respectively, carried by the left side frame 122, and on an auxiliary frame, not shown. The type wheels 117 are carried on sleeves provided with gears (not shown) which mesh with the gears 116.

Type wheel aliner

When an aliner 130 is rocked in a manner hereinafter described, it engages all of the gears 116 and simultaneously alines the three lines of type wheels 117, 118, and 119.

The aliner 130 is pivotally mounted on a shaft 131, carried by the side frame 122 and the auxiliary frame (not shown). One arm of the aliner 130 extends downwardly and is provided with a stud 132 coacting with a cam 133 on the cam shaft 46. Also secured to the shaft 46 (Fig. 5) is a gear 136 meshing with an intermediate gear 137 rotatably mounted on a shaft 138. The intermediate gear 137 meshes with a gear 139 rotatably mounted on the shaft 140. The gear 139 meshes with the beforementioned gear 101, secured to the main shaft 31 of the machine. Therefore, when the main shaft 31 receives its clockwise rotation, the shaft 46, through the gears 139, 137, and 136, is rotated counter-clockwise (Fig. 5) and clockwise (Fig. 1). At the beginning of machine operation, the cam 133, coacting with the stud 132, rocks the aliner 130 to engage its aliner bar with the teeth of the gears 116 to aline the type wheels in the manner before described.

Audit tape

All the data entered into the machine is recorded on an audit tape 145 (Fig. 1). The audit tape is fed from a supply roll 146 rotatably mounted on a stud 147 carried by a removable frame. The audit tape is fed around suitable guide rollers 148 and a stud 149 over an ink supply roller 150 to a receiving roll 151. The supply roll stud 147, the guide rollers 148, the stud 149, the ink supply roller 150, and the receiving roll 151 are all carried on a frame which is removable from the machine for easy replacement of the audit tape supply roll.

The end of the audit tape is held on the receiving roll 151 by a key 152 in the usual manner. Secured to the side of the receiving roll 151 is a feed ratchet wheel 153, with which an actuating arm 154 engages to line-space the audit tape during each operation of the machine. The arm 154 is secured to a shaft 155 carried in the framework of the machine. Also secured to the shaft 155 is a gear 156 meshing with a gear 157 rotatably mounted on a stud 158. The gear 157 meshes with a gear 159 on the main shaft 31.

When the main shaft 31 is given its complete rotation during the machine operation, the shaft 155 is also rotated through the gears 159, 157, and 156 to rotate the arm 154 one complete rotation. As the shaft 155 nears the end of its rotation, the arm 154 engages between teeth of the ratchet wheel 153 and rotates the receiving roll a distance sufficient to line-space the printing on the audit tape.

A non-retrograde alining pawl 160 is pivoted on a stud 161 carried by the removable audit tape frame. A spring 162 urges the pawl 160 into engagement with the teeth of the ratchet wheel 153. The pawl is provided with two bevel edges normally engaging on each side of a tooth of the ratchet wheel, thus providing a means for preventing non-retrograde movement and also accidental rotation in a feeding direction.

Audit tape printing hammer

The data is recorded on the audit tape by a printing hammer 170, slidably mounted on a stud 171 and on a shaft 172. A spring 173 normally maintains the hammer in its retracted position.

The hammer is impelled against the action of the spring 173 by a cam 174 secured to the shaft 172. Also secured to the shaft 172 is a gear 175, meshing with the beforementioned gear 156. The hammer 170 is provided with a roller 176 lying in the path of the cam 174. When the cam 174 is rocked during each operation of the machine, the cam, coacting with the roller 176, impels the hammer 170 to carry the audit tape against the type wheels 118 to record thereon the data set up on said type wheels. An ink ribbon 177 is fed through the machine past each of the sets of type wheels 117, 118, and 119, to provide means for recording the data on the audit tape. The ribbon mechanism is described hereinafter.

Slip printing mechanism

A table 180 is provided, which is supported on the framework of the machine to receive the printed form 181 (Fig. 8) for recording the data thereon from the set of type wheels 119. The table 180 is provided with suitable adjustable stops, which are adjusted to properly aline the spaces on the form in which the data is to be entered. As will be observed by referring to Fig. 8, there are six areas on the form 181, in which data is to be entered, and each area is allotted to a definite pay period. The stops are positioned for the particular pay period. For example, when the March taxes are due, the area indicated by the legend "receipt #1" will be positioned in line with the printing wheels 119 and an electro plate 179. When the "May" pay period becomes due, the adjustable stops are set so that, when the form 181 is inserted in the machine, the area carrying the legend "receipt

2" will be positioned to receive the printed data. The adjustable stops are so arranged that any one of the six areas can be located with reference to the printing wheels 119 and the electro plate 179.

The data is entered on the form 181 by a hammer 185, located beneath the table 180. A suitable opening is provided in the table 180 to permit the hammer to pass through the table and carry the form 181 thereon and the ribbon 177 against the type wheels 119 and the electro plate 179. The hammer 185 is pivotally mounted on a stud 186, and the hammer carries a roller 187 at its free end. The cam 188 is secured to a shaft 178 in position to be engaged by the roller 187. A gear 135, secured to the shaft 178, meshes with a gear 134 on the shaft 46. When the shaft 46 is rotated in a clockwise direction, the cam 188 is rotated by the gears 134 and 135, and the cam 188, coacting with the roller 187, lifts the hammer 185 and carries the platen thereon into engagement with the under side of the form 181 and carries the form and the ribbon 177 against the type members. After the impression has been made and upon continued rotation of the cam 188, the hammer 185 drops to normal position, as controlled by the cam 188, under the action of gravity.

Slip holding means

A means is provided to hold the form 181 against accidental shifting during the printing operation thereon. The means for holding the form 181 against accidental shifting includes a pair of arms 190 rotatably mounted on the shaft 87 and side-spaced so as to grip the insertable slip adjacent the ends of the printing platen or hammer 185. To grip the form, the arms 190 are provided with a pair of holding surfaces 191, which are moved into their elevated positions by a spring 192, one end of which is connected to a stud on one arm 190 and the other end is connected to a stud on the machine frame. A suitable opening is provided in the table 180 to permit the spring to elevate the arms therethrough, after which the form is elevated and impinged against a guard plate 193, located slightly above the table 180.

When the machine is at rest, the gripping means 191 are held in the lower position by a cam 195, normally lying in the path of a stud 196 supported between the two arms 190. When the shaft 178 starts to rotate at the beginning of the machine operation, the cam 195 is rotated out of contact with the stud 196 to permit the spring 192 to elevate the arms 190 and cause the gripping ends 191 thereof to pass through the opening in the table 180 and grip the form between said arms and the guard plate 193. Near the end of machine operation, when the cam 195 returns to its home position, the cam, engaging the stud 196, lowers the gripping arms 190 and restores them into the position shown in Fig. 1.

Machine release control by the insertable form

In order that the machine cannot be operated without the form 181 being in proper position, a means is provided to normally lock the release shaft 87 against releasing movement until the form is in proper position. This means includes a locking arm 200 pivotally mounted on a shaft 201 carried by the framework of the machine. The arm 200 is urged counter-clockwise by a spring 202 and is limited in such movement by a stud 203, to which one end of the spring 202 is also attached.

A forward extension 204 of the locking arm 200 normally lies in the path of a stud 205 on an arm 206 secured to the release shaft 87. Therefore, as long as the arm 200 is in the position shown in Fig. 1, the release shaft cannot move, and therefore the machine can not be released for operation. The insertion of a form 181 in the table 180 rocks the locking arm 200 clockwise a distance sufficient to withdraw the extension 204 from the stud 205. For this purpose, the upper end of the locking arm 200 is shaped in the form of an angle, which normally projects through an opening in the table 180 and to a recess formed on the guard plate 193. When the form 181 is positioned on the table and moved into proper position, the form, engaging the angle surface on the locking arm 200, rocks the locking arm 200 clockwise until the form is free to pass over the apex of the angle on the free end of the locking arm 200. This movement of the locking arm 200, which is imparted by the insertion of the form, is sufficient to withdraw the extension 204 from the path of the stud 205 on the release shaft, and therefore the machine can be released in the manner hereinbefore described. The spring is of light construction to permit the form 181, which is printed on paper stock stiff enough for the purpose, to obtain the results described.

Voucher printing mechanism

The voucher 210 (Fig. 9) is certified by the machine by being inserted into a receptacle provided therefor before the machine is released for operation. A receptacle 211 is supported in the framework of the machine and is provided with a slot 212, into which the voucher 210 is positioned. Normally, the machine release shaft 87 is locked against releasing movement when no voucher 210 is in the receptacle 211. Positioning of the voucher 210 into the receptacle release mechanism, presently described, to permit the release of the machine. Also, if the operator should forget to remove the voucher from the receptacle 211 after the machine has completed its operation, the machine release shaft 87 will be automatically locked against releasing movement until the voucher is removed therefrom and a new voucher inserted therein.

Voucher-controlled machine locking means

In addition to the previously described locking means, the machine release shaft 87 is normally locked against releasing movement by a locking member 213 (Figs. 1, 2, 3, and 4). Connected to one of the beforementioned arms 105 is a link 214, also connected to a yoke 215, pivoted on a shaft 216. The yoke 215 has formed thereon an arm 217, on which a stud 218 is mounted. The stud 218 is engaged by a bifurcated end of an arm 219 pivoted on a shaft 220. The arm 219 is provided with a forwardly extending finger 221, normally resting on the upper end of a finger 222 of the beforementioned locking member 213. The locking member 213 is pivoted on a stud 223 and is provided with a yoke normally bearing against the shaft 224, where it is held by a spring 226. An arm 225 on the member 213 enters openings in the slot 212 so as to lie in the path of the voucher when the voucher is inserted therein.

As long as the upwardly-extending finger 222 lies in the path of the finger 221, the machine release shaft 87 is locked against rotation. The insertion of the voucher 210 into the slot 212 engages the arm 225 and rocks the locking member 213 clockwise to withdraw the finger 222 from the path of the finger 221. Thereafter, upon depression of the motor bar 75, when the shaft 87 is released, the arm 219 is free to rotate clockwise and permit the release of the machine for operation.

Figures 2, 3, 4:
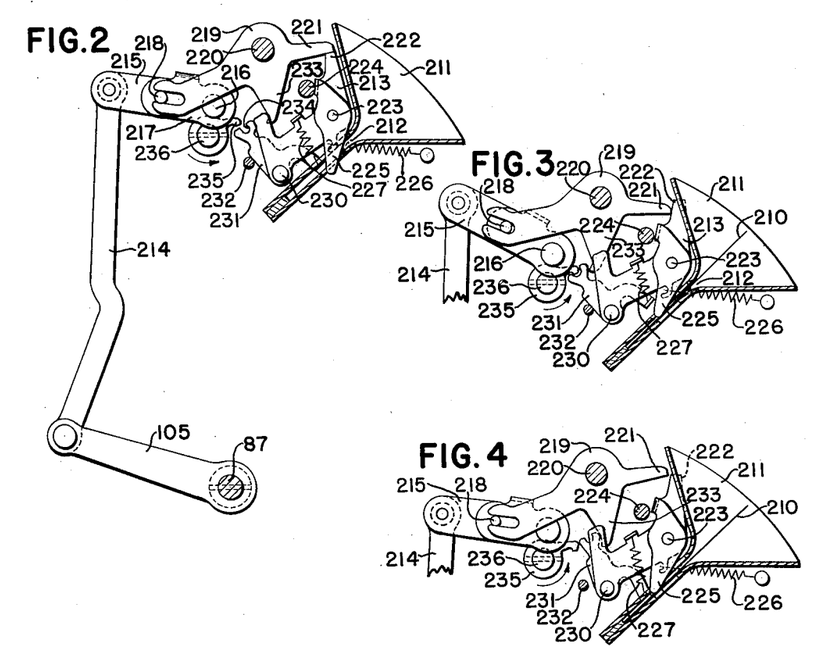
Fig. 2 is a detail view of the insertable voucher controlling means to prevent operation of the machine when no voucher is in the voucher chute and to prevent a succeeding operation of the machine until the voucher has been removed from the chute and a new voucher positioned therein.
Fig. 3 is a detail view showing the mechanism of Fig. 2 in the position which it assumes when the machine is released.
Fig. 4 is a detail view of the mechanism shown in Figs. 2 and 3 and shows the position which the parts assume at the end of the machine operation with the voucher remaining in the voucher chute.

As long as the voucher 210 remains in the slot 212, the finger 222 remains out of the path of the finger 221, and therefore the machine could be released for operation without the removal of the voucher 210 from the slot 212. It is desired to prevent such repeat operation before the voucher 210 has been removed from the machine. In order to accomplish this, a second means is provided for preventing the rocking movement of the arm 219 when the voucher 210 is left in the slot 212 after the completion of a machine operation. Pivotally mounted on the rear end of the latch member 213, on a stud 230, is an interponent 231, which normally lies against a rod 232. When the machine is released for operation, a downwardly-extending finger 233 of the arm 219 moves against one side of the interponent 231, as shown in Fig. 3. The upper end of the interponent is provided with a notch 234, which is a a clearance notch to engage a camming member 235, secured to a rotating shaft 236. The shaft 236 receives one complete counter-clockwise rotation (Figs. 2, 3, and 4) during each machine operation by means hereinafter described. Near the end of this complete rotation, the cam member 235 moves into engagement with the under side of the interponent 231 and moves the interponent into engagement with the downwardly-extending finger 233 of the arm 219 after the arm 219 has been restored to its normal postion.

The relative positions of the parts at the end of a machine operation, with the voucher 210 remaining in the slot 212, are shown in Fig. 4. This figure shows that the finger 233 is engaged by the interponent 231, and that the interponent 231 is held against the cam member 235. Therefore, if an attempt is made to release the machine for operation by the depression of the motor bar 75, the interponent 231 and the cam member 235 prevent the arm 219 from rocking clockwise and therefore prevent rocking movement of the release shaft 87. Thus, so long as the voucher 210 remains in the slot 212, the machine cannot be released for operation. When the voucher 210 is withdrawn from the slot 212, the locking member 213 drops in a counter-clockwise direction to withdraw the interponent 231 from between the the finger 233 and the cam member 235. At this time, the parts assume the position shown in Fig. 2, and, upon the insertion of another voucher into the machine, the locking member 213 is again rocked clockwise to permit the machine to be released for operation.

As mentioned before, the notch 234 is merely a clearance notch to permit the interponent to rise when a voucher is positioned into the slot 212. This notch has no other function.

The shaft 236 is rotated by a gear 237, sleeved to the gear 157. The gear 237 meshes with a pinion 238 secured to the shaft 236. Thus, when the machine is operated and the main shaft 31 receives its rotation, the shaft 236 is rotated through the train of gears including the pinion 238 and the gears 237, 157, and 159.

Voucher printing mechanism

The data printed on the lower line 245 (Fig. 9) of the voucher 210 is recorded thereon by a printing hammer 240 pivoted on a shaft 241. The hammer 240 is actuated by a cam 242 secured to the beforementioned shaft 236. A spring 246 maintains the hammer 240 in its normal position, shown in Fig. 1.

When the main shaft 31 is rotated in the manner hereinbefore described, and the shaft 243 is rotated, the cam 242, engaging a roller 244 on the hammer 240, impinges the voucher 210 and the ribbon 177 against the type wheels 117 to take impressions on the voucher.

Ribbon mechanism

The ribbon 177 is illustrated by dot-and-dash lines and is of the endless type, supported on rods carried by a removable frame in the machine in the usual manner. The ribbon is fed over an ink roller 250, provided with a ratchet wheel 251. A feed pawl 252 is spring-urged to engage a ratchet wheel 251, and the right end (Fig. 1) of the pawl 252 is pivoted on a lever 253. The lever 253 is pivoted on a stud 254, and its upper end is provided with a roller engaged by the beforementioned cam 174. During each operation of the machine, the cam 174 rocks the lever 253 clockwise to space the ribbon one step. A spring 255 restores the lever 253 to its home position as the high point of the cam 174 passes from engagement with the roller on the lever 253.

Summary of machine release controls

From the above it is clear that the machine release shaft 87 is controlled from four sources. First, the releasing movement of the shaft 87 is under control of the motor bar 75. Second, the form 181 must be in position on the table 180, and the arm 200 must be disengaged from the stud 205. Third, the locking member 213 must be withdrawn from the finger 221 of the arm 219. In addition, as long as the voucher remains in the voucher slot 212 at the end of the machine operation, the interponent 231 prevents release of the release shaft 87 until after the voucher 210 is withdrawn from the slot 212 to withdraw the interponent 231 from the path of the finger 233.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a normally locked machine of the class described, the combination of operating means for the machine, said operating means including a main shaft, machine releasing means operable to enable the operating means to operate the machine, a record material receptacle, a locking member normally locking the machine release means against operation, a finger on the locking member projecting into the receptacle and into the path of movement of the record material when inserted into the receptacle so as to be actuated by the record material as the record material is positioned into the receptacle to actuate the locking member and unlock the machine releasing means, a device carried by the locking member, means on the main shaft to move the device into engagement with the machine releasing means, said device being held in the path of movement of the machine releasing means by the locking member when the locking member is held in said actuated position by the record material in the receptacle to lock the machine releasing means against subsequent releasing movement until the record material is withdrawn from the receptacle upon completion of a machine operation, and means to withdraw the locking member from said actuated position when the record material is withdrawn from the receptacle.

2. In a normally locked machine of the class described, the combination of operating means for the machine, said operating means including a main shaft, machine releasing means operable to enable the operating means to operate the machine, a record material receptacle, a locking member normally locking the machine release means against operation, a finger on the locking member projecting into the receptacle and into the path of movement of the record material when the record material is inserted into the machine so as to be actuated by the record material to unlock the machine releasing means, a cam on the main shaft, an interponent pivotally mounted on the locking member and extending between the cam and one element of the machine releasing means when the locking member is held in said actuated position by the record material, said cam moving the interponent into engagement with the said one element to hold the releasing means against releasing movement until the record material is withdrawn from the receptacle, and means to withdraw the locking member from said actuated position when the record material is withdrawn from the receptacle.

3. In a normally locked machine of the class described, the combination of main operating means for the machine, machine releasing means operable to enable the operating means to operate the machine, a record material receptacle, a locking member normally locking the machine release means against operation, a finger on the locking member projecting into the receptacle and into the path of movement of the record material when the record material is inserted into the machine so as to be actuated by the record material to unlock the machine releasing means, said main operating means including a main shaft, a cam on the main shaft, and an interponent between the cam and one element of the machine releasing means, said cam moving the interponent into engagement with the said one element to hold the releasing means against releasing movement until the record material is withdrawn from the receptacle, said interponent being carried by the locking member.

4. In a normally locked machine of the class described, the combination of main operating means for the machine, machine releasing means operable to enable the operating means to operate the machine, a record material receptacle, a locking member normally locking the machine release means against operation, a finger on the locking member projecting into the receptacle and into the path of movement of the record material when the record material is inserted into the machine so as to be actuated by the record material to unlock the machine releasing means, said main operating means including a main shaft, a cam on the main shaft, and an interponent between the cam and one element of the machine releasing means, said cam moving the interponent into engagement with the said one element to hold the releasing means against releasing movement until the record material is withdrawn from the receptacle, said interponent movably mounted on the locking member and movable out of engagement with the machine release means when the locking member is released upon withdrawal of the record material from the receptacle.

5. In a normally locked machine of the class described, the combination of main operating means for the machine, machine releasing means operable to enable the operating means to operate the machine, a record material receptacle, a locking member normally locking the machine release means against operation, a finger on the locking member projecting into the receptacle and into the path of movement of the record material when the record material is inserted into the machine so as to be actuated by the record material to unlock the machine releasing means, said main operating means including a main shaft, a cam on the main shaft, and an interponent between the cam and one element of the machine releasing means, said cam moving the interponent into engagement with the said one element to hold the releasing means against releasing movement until the record material is withdrawn from the receptacle, said interponent consisting of a pivoted member carried by the locking member so as to be movable thereon and movable therewith.

6. In a normally locked machine of the class described, the combination of main operating means for the machine, machine releasing means operable to enable the operating means to operate the machine, a record material receptacle, a locking member normally locking the machine release means against operation, a finger on the locking member projecting into the receptacle and into the path of movement of the record material when the record material is inserted into the machine so as to be actuated by the record material to unlock the machine releasing means, said main operating means including a main shaft, a cam on the main shaft, and an interponent between the cam and one element of the machine releasing means, said cam moving the interponent into engagement with the said one element to hold the releasing means against releasing movement until the record material is withdrawn from the receptacle, said interponent consisting of a pivoted member carried by the locking member and movable on the locking member when moved by the cam and movable with the locking member when the locking member is released by the withdrawal of the record material from the receptacle.

7. In a machine of the class described, the combination of main operating means for the machine, a machine releasing means operable to enable the operating means to operate the machine, a record material receptacle, a locking member normally engaging the machine releasing means so as to lock the machine releasing means, said locking member supported to be normally held in said locking position by the force of gravity, an extension on the locking member projecting into the record material receptacle and into the path of movement of the record material when the record material is inserted into the receptacle, whereby the record material engaging the extension upon being inserted into the receptacle lifts the locking member to unlock the machine releasing means to permit release of the machine only after a record material has been positioned into the receptacle, a device supported on the locking means, said device engageable with the releasing means, means operated by the machine operating means to engage said device and thereby lock the releasing means to prevent a subsequent release of the machine releasing means as long as the record material remains in the receptacle, and means to withdraw the device from engagement with the releasing means when the record material is withdrawn from the receptacle.

8. In a machine of the class described, the combination of main operating means for the machine, a machine releasing means operable to enable the operating means to operate the machine, a record material receptacle, a locking member normally engaging the machine releasing means so as to lock the machine releasing means, said locking member supported to be normally held in said locking position by the force of gravity, an extension on the locking member projecting into the record material receptacle and into the path of movement of the record material when the record material is inserted into the receptacle, whereby the record material engaging the extension upon being inserted into the receptacle lifts the locking member to unlock the machine releasing means to permit release of the machine only after record material has been positioned into the receptacle, a device supported on the locking means, said device engageable with the releasing means, means operated by the machine operating means to engage said device and thereby lock the releasing means to prevent a subsequent release of the machine releasing means as long as the record material remains in the receptacle, and means to move said locking member into its normal locking position upon removal of the record material from the receptacle to prevent subsequent release of the machine until other record material is positioned into the receptacle.

9. In a machine of the class described, the combination of main operating means for the machine, a machine releasing means operable to enable the operating means to operate the machine, a record material receptacle, a locking member normally engaging the machine releasing means so as to lock the machine releasing means, said locking member supported to be normally held in said locking position by the force of gravity, an extension on the locking member projecting into the record material receptacle and into the path of movement of the record material when the record material is inserted into the receptacle, whereby the record material engaging the extension upon being inserted into the receptacle lifts the locking member to unlock the machine releasing means to permit release of the machine only after record material has been positioned into the receptacle, a device supported on the locking means, said device engageable with the releasing means, means operated by the machine operating means to engage said device and thereby lock the releasing means to prevent a subsequent release of the machine releasing means as long as the record material remains in the receptacle, and means to render the means operated by the machine operating means ineffective and the locking means again effective upon withdrawal of the record material from the receptacle.

10. In a normally locked machine of the class described, the combination of printing means, a record material receptacle into which record material is positioned, main operating means for the machine, a machine release mechanism operable to enable the operating means to operate the machine, a latch normally engaging one element of the machine release mechanism to prevent releasing movement thereof, said latch extending into the receptacle and into a position to be engaged and actuated by the record material, when the record material is positioned into the receptacle, to withdraw the latch from engagement with the machine release mechanism to free the machine release mechanism for operation, means operated by the main operating means to restore the machine releasing means to locking position at the end of the machine operation and while the record material is in the receptacle and the latch is held out of engagement with said one element, a device carried by the latch engageable with said one element when the latch is held out of engagement with said element at the end of the machine operation, and means on the main operating means to engage and move said device into engagement with said element at the end of a machine operation to prevent release of the machine when the record material is in the receptacle, said latch movable into locking position upon withdrawal of the record material from the receptacle, said device being simultaneously withdrawn from engagement with the said one element.

FRANK R. WERNER.

REFERENCES CITED

The following references are of record in the file of this patent:

UNITED STATES PATENTS

| Number | Name | Date |
| --- | --- | --- |
| 1,094,536 | Muller | Apr. 28, 1914 |
| 1,786,454 | Robertson | Dec. 30, 1930 |
| 1,965,740 | Green | July 10, 1934 |
| 2,349,660 | Hughes et al. | May 23, 1944 |

FOREIGN PATENTS

| Number | Country | Date |
| --- | --- | --- |
| 589,653 | Great Britain | June 26, 1947 |